(12) United States Patent
Niemelä

(10) Patent No.: US 8,918,878 B2
(45) Date of Patent: Dec. 23, 2014

(54) RESTORATION OF FILE DAMAGE CAUSED BY MALWARE

(75) Inventor: Jarno Niemelä, Espoo (FI)

(73) Assignee: F-Secure Corporation, Helsinki (FI)

( * ) Notice: Subject to any disclaimer, the term of this patent is extended or adjusted under 35 U.S.C. 154(b) by 184 days.

(21) Appl. No.: 13/199,928

(22) Filed: Sep. 13, 2011

(65) Prior Publication Data

US 2013/0067576 A1    Mar. 14, 2013

(51) Int. Cl.
*G06F 21/00* (2013.01)
*G06F 21/56* (2013.01)

(52) U.S. Cl.
CPC .................................. *G06F 21/568* (2013.01)
USPC .................. 726/24; 726/22; 726/23

(58) Field of Classification Search
CPC ........................................ G06F 21/568
USPC ................................. 726/23, 24, 25
See application file for complete search history.

(56) References Cited

U.S. PATENT DOCUMENTS

| | | | | |
|---|---|---|---|---|
| 6,401,210 | B1 * | 6/2002 | Templeton ..................... | 726/24 |
| 7,934,229 | B1 * | 4/2011 | Vogel .............................. | 725/24 |
| 2004/0181687 | A1 | 9/2004 | Nachenberg | |
| 2007/0100905 | A1 | 5/2007 | Masters et al. | |
| 2008/0115215 | A1 * | 5/2008 | Bardsley ......................... | 726/24 |
| 2009/0199297 | A1 * | 8/2009 | Jarrett et al. ................... | 726/24 |
| 2011/0099633 | A1 * | 4/2011 | Aziz ............................... | 726/24 |

OTHER PUBLICATIONS

A guideline to anti-malware-software testing; Marx; European Institute for Computer Anti-Virus Research papaer, 2000, 36 pages.*
"Malware behavioral analysis system: TWMAN", Huang et al; IEEE 2008, 8 pages.*
"Unhide.exe"—A introduction as to what this program does, Jun. 20, 2011, XP55042671, Retrieved from the Internet: URL: http://www.bleepingcomputer.com/forums/topic405109.html pp. 1,2,4.
"F-Secure Virus Descriptions: Gpcode", Mar. 23, 2009, XP55042736, Retrieved from the Internet: URL: http://web.archive.org/web/20090323073907/http://www.f-secure.com/v-descs/gpcode.shtml.

* cited by examiner

*Primary Examiner* — Jason Lee
(74) *Attorney, Agent, or Firm* — Harrington & Smith

(57) ABSTRACT

In accordance with an example embodiment of the present invention, there is provided a method including: detecting a malware in a computer system and in response to the detection of the malware in the computer system initiating a deactivation of malware; detecting a file altered by the malware in response to a successful deactivation of the malware; and initiating a restoration of the altered file in response to the detection of the file altered by the malware.

17 Claims, 3 Drawing Sheets

| Type | Subtype | Target | Modification | Restoration |
|---|---|---|---|---|
| MW1 | R1 | Filetype1 | Mod1 | Inst1 |
|  | R2 | Filetype2 | Mod2 | Inst2 |
|  | ⋮ | ⋮ | ⋮ | ⋮ |
|  | RN | FiletypeN | ModN | InstN |
| MW2 | X1 | Y1 | Modx | Instx |
|  | X2 | Y2 | Mody | Insty |
|  | ⋮ | ⋮ | ⋮ | ⋮ |
|  | XN | YN | Modz | Instz |
| MWN | ... | ... | ... | ... |

Fig. 2

RESTORATION OF FILE DAMAGE CAUSED BY MALWARE

TECHNICAL FIELD

The invention concerns in general the technical field of malware monitoring in computer devices. Especially the invention concerns a restoration of a damage caused by a malware infection.

BACKGROUND

Malicious software, also known as malware, refers to any software designed to infiltrate or damage a computer system without the owner's informed consent. Malware may include multiple types of software, such as computer viruses, worms, trojan horses, rootkits, adware, spyware, ransomware and any other malicious and unwanted software.

Once malicious software gains access to a computer system, it takes various actions resulting in a variety of undesirable results depending on the type of malware. For example, malicious software code corrupts application software code, resulting in abnormal termination of the application, and/or may cause degradation of system performance. The user of an infected device may incorrectly assume that poor performance is a result of software flaws or hardware problems, taking inappropriate remedial action, when the actual cause is a malware infection of which the user is unaware. Thus, it is desirable that malicious software can be removed from the computer system.

In order to remove malware from the computer system, the malware needs to be detected. Depending on the type of malware the detection of malware may be challenging as the malware authors design their software to be difficult to detect, often employing technology that deliberately hides the presence of malware on a system, i.e. the malware application may not appear on the operating system tables that list currently running processes.

Further, a complete and permanent removal of malicious code may turn out to be difficult. For example, malicious code may store a copy of itself in the memory of a computer. Upon termination or removal of malicious code components, the stored copy of the malicious code restores and/or recreates the removed malicious code components. Alternatively or in addition, malicious code may have been associated with a valid process executing on a computer system. Attempts to eliminate the malicious code may result in an abnormal termination of the valid process and thus failure in an operation of a software program or a system.

Whilst malware has long been a problem in personal computers (PCs) it is now becoming an issue in mobile telecommunications technology. As the use of mobile telecommunications technology spreads and its applications become more diverse, security threats to mobile devices and the data they hold are becoming more common.

One type of malware is so called ransomware. Ransomware is malware that takes a computer as hostage in order to force the user to give money to the author of the malware. If the ransom is paid, the operation of the computer is restored. Ransomware typically accesses the system as a conventional virus or worm i.e. through an application coupled to a network or through an email attachment, for example. The operation of ransomware can be described in the following way: a) the ransomware accesses a computer device and is executed therein, b) the computer device is taken as hostage, which shows as untypical behaviour of the computer and/or data in the computer, c) the user gets a prompt that in order to restore the operation of the computer and/or data back to normal, the user shall pay ransoms in some way, d) if the user carries out the required actions e.g. pays the ransoms, the user gets instructions for restoring the computer (e.g. a code to be inputted to the ransomware program for restoration).

The ransomware can take the computer or files as hostage in multiple ways. The operation may start when booting the system. The result can be that the user cannot execute programs other than the ones required to pay the ransom or to give instructions with respect to the payment of the ransom. Alternatively, the ransomware can terminate non-essential programs that may be running or make them operate in an incorrect way. In addition to system and application related files the ransomware may take so called user files as hostage. With the term user file shall be understood any file, which has some relationship with the user(s) of a computer device. Such files are e.g. documents, pictures and movies, which have importance to the user, but not directly to the operating system or the computer applications.

The ransomware may alter the files in many ways, e.g. by hiding the files (non-visible), modifying the access rights of the files, locking the files, encrypting the files, moving the files to another (hidden) location in the file system, mixing up the names or any possible combination of these. Moreover, the ransomware may focus its operation to certain types of files only, such as pdf files.

All in all, from a user's perspective it is essential to deactivate the malware from the computer system as soon as possible. Luckily, anti-virus software are developed to detect and deactivate malware. In order to detect a malware program the anti-virus software must have some way of identifying it amongst all the other files present on a computer device. Some known methods are signature-based detection, detection based on heuristic methods and rootkit detection. When the malware is detected, the detected piece of software is deactivated by e.g. removing it from the computer system in order to restore the operation of the computer. This applies also to malware of ransomware type. Typically, ransomware is quite easy to detect with the methods mentioned above and easy to deactivate as such.

However, the drawback of the current situation is that even if the ransomware is detected and deactivated it does not solve all the problems faced by a user. Namely, there is no mechanism to restore the files, which are infected i.e. altered by the ransomware.

SUMMARY

Various aspects of examples of the invention are set out in the claims.

An objective of the invention is to present a method, a computer device, a server and a computer program product for monitoring malware and take actions in response to a detection of malware. A further objective of the invention is to restore data infected by the malware detected.

According to a first aspect of the present invention the objectives of the invention are achieved by a method of detecting a malware infection in a computer system and in response to the detection, deactivating the malware and analyzing the damages in files in the computer system caused by the malware. Furthermore, if damages in files are detected, the method comprises a step of initiating a restoration of the damage in the file.

According to some further aspect of the invention the objectives of the invention are achieved by a method of basing the detection of damage in a file to reviewing alterations in access rights and/or modifications of a predetermined type to the file.

Some aspects of the invention relate to defining an access time of the malware in the system and based on that focusing the detection of alterations of files according to a time window between a time of access of the malware in the computer device system and a time of deactivation of the malware.

Some aspects of the invention relate to a method of detecting the at least partly altered file based on a predetermined file type targeted by a detected malware.

Some aspects of the invention relate to a method of detecting the at least partly altered file based on a comparison of a file to a corresponding backup file.

According to some further aspects of the invention the restoration of the altered file is based on a detection of at least one of the following: a modification to access rights of the file, a modification of a predetermined type to the file.

Furthermore, some aspects of the current invention relate to a method, wherein the restoration of the altered file is accomplished by replacing the detected modified altered file with a corresponding backup file.

The objectives of the invention are also met with a computer device, a server and a computer program product according to the invention comprising means and instructions for implementing the method as described.

A method according to the invention is characterized by the steps recited in the characterizing part of the independent claim directed to a method.

A device according to the invention is characterized by the features recited in the characterizing part of the independent claim directed to a device.

A server according to the invention is characterized by the features recited in the characterizing part of the independent claim directed to a system.

A computer program product according to the invention is characterized by the features recited in the characterizing part of the independent claim directed to a computer program product.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

For a more complete understanding of example embodiments of the present invention, reference is now made to the following descriptions taken in connection with the accompanying drawings in which:

FIG. 2 illustrates an example of a data structure according to an embodiment of the invention, and;

DETAILED DESCRIPTION OF THE DRAWINGS

In order to improve security in computer devices and at least partially overcome some of the drawbacks described above, a new method relating to restoration of a file damage caused by a malware in a computer system is described here. The computer system is protected with malware detection software, which is run by means of processing resources of the computer device or alternatively with a cloud antivirus model, which means that there is only a lightweight agent software on the computer device while the majority of the data detection and processing is carried out in a network infrastructure.

Figure 1:
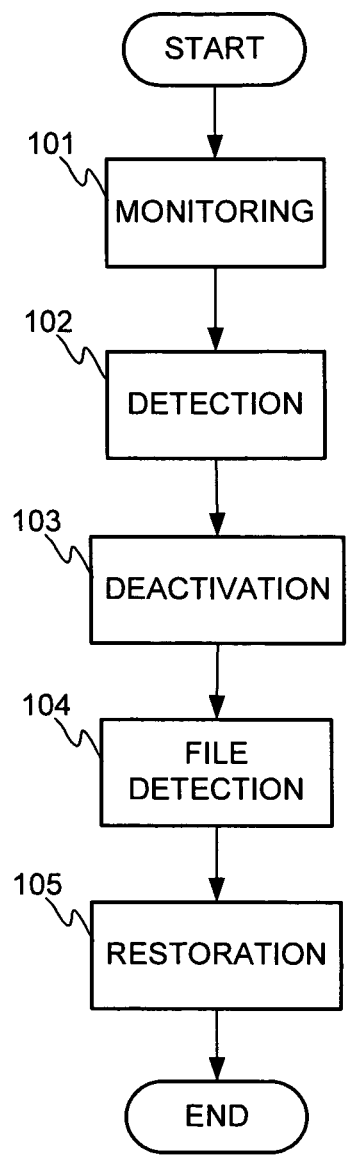
FIG. 1 illustrates a flow chart of the method according to an embodiment of the invention.

FIG. 1 illustrates a flow chart of a method according to an embodiment of the invention on a fundamental level. Malware detection software is configured to monitor 101 the system when executed in processing resources of a device. The aim of the monitoring 101 is to find harmful processes and/or files belonging to the malware involved in the harmful process. A detection of a malware occurs in a computer device 102. The detection can be based for example on a scanning of ingoing and outgoing data traffic to and from the device. Alternatively, the detection can be based on a continuous scanning of processes in the computer device. Further, the detection can be based on a scanning of files stored in the computer device.

The detection of malicious software in the computer system causes an initiation of a deactivation of the malware 103 by deriving deactivation instructions of the malware from a database coupled to the malware detection software either directly in the computer device or indirectly from a server in a network.

According to another embodiment of the invention the detection of malicious software in the computer system causes the malware detection software to identify the type of the malware. This may comprise a step of identifying the malware as ransomware. This can be achieved by identifying the detection name derived by the malware detection software or the information may be derived from a server. According to a further embodiment of the invention the detection of the malware as ransomware can be carried out during the file alteration analysis described later if needed.

The deactivation of the ransomware 103 is initiated in the computer device. Typical method for deactivating the malware is to remove i.e. delete at least part of the software code belonging to the malware. Alternatively or in addition, the deactivation of malware 103 is carried out by isolating at least part of the software in such a manner that it cannot cause the negative effects on the system and/or files therein. The isolation can be implemented by detecting the ransomware-related programs and/or processes executed by the processing means of the computer device and deactivating the operation of those. Furthermore, the malware detection software is preferably configured to prevent the re-activation of the detected items after deactivation.

If the deactivation of the malware 103 carried out by the computer device is not successful, the computer device can be configured to request support from a network element. The computer device may, for instance, send information available on the malware to the network element, or request the network element to accomplish the deactivation. In the worst case the malware cannot be deactivated. In such a situation the malware detection software may be configured to shut down the computer device to prevent further damages to the system and data.

In order to return the system to operate in a similar manner as it was operating before the infection by a ransomware there is a need to detect files in the computer system, which are affected by the ransomware if any. For example, the detection can be implemented by means of file scanning i.e. the malware detection software is configured to scan files and/or file locations in the device. The detection is started in response to a successful deactivation of the malware e.g. ransomware. The detection of infected files 104 may be based on predetermined alterations occurred in a file. The description of predetermined alterations can be stored in a memory accessible by the malware detection software. The malware detection software is configured to compare the predetermined alterations to files and based on the comparison to detect the infected files. For example, if it is recognized that a certain file is hidden (e.g. visibility flag set to invisible), the malware detection software may recognize the infection by the flag status mentioned.

Alterations typical to the ransomware can be broadly divided into two groups: modifications to access rights and modifications to the files in general. An example of alteration in access rights is that the malware modifies, e.g. limits access rights of user(s) of the computer device to a file thus making it inaccessible the user(s) or making a file invisible to a user i.e. causing inaccessibility to the file or moving files to another (hidden) location in the file system. Such an alteration can be detected by carrying out a so called sanity check to predetermined files. The sanity check means that there are some predetermined assumptions set to e.g. group of files and it is checked if the assumption is true or not. An example in practice can be that it is assumed that all user files, e.g. photos, in the computer shall be visible to a user, and this assumption is checked. If some file is not visible, then it can be suspected that the file has faced an alteration caused by a malware.

Some examples of the modifications to the files made by a malware are locking files, encrypting files, mixing up the names and obfuscation of files. Such modifications can be detected by e.g. reviewing file extensions and by doing a file format sanity check. An example in practise is that if some file has a certain file format extension, but the file structure check does not match the extension, it can be suspected that the file is infected. Malware may also alter the file with any combination of the modifications mentioned above. According to an embodiment of the invention the search for infected files is primarily focused on files comprising alterations as mentioned above. According to another embodiment of the invention the malware detection software may access data comprising information on predetermined alterations typical to a specific malware. In such a case the malware detection software may focus the detection to only a certain type of alterations typical to the malware detected. Furthermore, another further approach to detect the infected files is to access data, which contains information on the target files of a specific ransomware. Such information may be stored in the memory of a computer device or in a network element. As a consequence, the malware detection software may have direct information on the files, which shall be examined for the infection.

According to a certain embodiment of the invention, if the malware detection software is incapable of detecting the alteration of a file, the computer device may request the detection from a server residing in a network. The server may accomplish the analysis of the file with the information stored in the server and return information to the computer device. Alternatively, the server may access to the computer device and detect alterations remotely.

If a file comprising alterations originating from a ransomware infection is detected 104, the malware detection software is configured to initiate a restoration of the infected files by accessing instructions to restore the file 105 to a state before infection. The instructions can be stored and be available in a database coupled to the malware detection software in a computer device or in a server residing in a network. For example, in a situation when the computer device is incapable of restoring a file, the computer device may be configured to request support from a server in network in restoration. The request may comprise a step of sending a file to the server where the restoration is accomplished. The restored file is returned to the computer device.

Next, examples of the restoration according to some embodiments of the invention are disclosed. If access rights of a file are modified, the restoration of the rights can be carried out e.g. by setting the access rights, such as a flag indicating the visibility of a file, according to default settings of the operating system and/or by resetting access rights to a file according to user information stored in the computer system and/or by killing any locking process of a file by means of operations executable by the malware detection software. In context of file modifications instructions for restoration can be derived from a database coupled to the computer system or from a server. Alternatively or in addition, the malware detection software may be configured to use reverse operations to some commonly known tricks used in obfuscation of files in order to restore the files. Known obfuscation tricks are e.g. performing a Boolean operation XOR with a bit pattern, e.g. 0xFF or 0xAA to a file, XOR or ADD first byte with the next one and then continuing byte by byte so that every byte is altered in the file data. Moreover, the malware detection software may be configured to apply some decryption algorithms to the file suspected of infection if it is recognized as being encrypted. In general, the malware detection software is configured to restore the system by applying every de-obfuscation instruction set stored in the database and/or server until either all known de-obfuscation methods have been used, or infected file has been restored.

Further aspects of the method according to some embodiments of the invention are now discussed by referring to FIG. 2. FIG. 2 illustrates an example of the data structure in e.g. a database utilized in the present invention. More specifically, the malware detection software may have access to the illustrated database and data there. The data item may comprise, for example, information categorized according to the type of malware MW1, MW2, . . . , MWN. Each type of malware is further divided to different subtypes. For example, malware type MW1 refers to ransomware-type malware. Under such a type there can be multiple subtypes to ransomware R1, R2, . . . , RN. This simply means that there are multiple malwares, which can be categorized to be as ransomware. Next, the data record may comprise information on target files of the ransomware in question. As an example, the ransomware R1 may target Filetype1 files. Correspondingly, ransomware R2 targets only Filetype2 and ransomware RN may target FiletypeN in the computer device. The file types can refer to a certain type of file, such as pdf, or to different categories of files, such as user files. Further, the data record may comprise information on the alterations Mod1, Mod2, . . . , ModN that are executed to target files by the ransomware. Finally, the data record may contain instructions Inst1, Inst2, . . . , InstN for restoring infected files. Similar kind of data record can be established to other types of malware, as is schematically illustrated with MW2 and MWN.

In some embodiments of the invention the method does not require information on the target file types for a ransomware, but merely analyzes each of the files in the computer device by utilizing the information on the alterations to find the infected files in the system as discussed in the context of FIG. 1.

According to an embodiment of the invention the method further comprises a step of analyzing the time of the infection i.e. when the ransomware has accessed the system and executed the infection. The defined time of infection can be utilized in detection of the files infected. For example, according to some embodiment of the invention the malware detection software is configured to analyze only files which are altered since the time of infection. According to some other embodiments of the invention only files with an alteration between the time of infection and time of deactivation of the ransomware are analyzed. The files matching the time window are analyzed and predefined alteration types are compared to the alteration occurred in a file. If the comparison indicates a ransomware infection, the instructions for restoration are retrieved from storage. An advantage of the analysis focused only on files altered since the infection is that it reduces the number of files to be analyzed and thus saves computing resources of the computer device.

According to a further embodiment of the invention the detection and analysis of infected files is based on a comparison of a file suspected of an infection to an earlier copy of the file. The search for suspected files can e.g. be based on the analysis of the time of infection as described above. The copies of the files in the computer device can be found in storage, such as a memory, if such copies are taken and stored in advance. According to some embodiment of the invention the copies of the files are stored in a network and are retrievable if needed according a predetermined backup process and schedule. By means of the comparison the infected files can be determined and the computer device executing the malware detection software, or any other entity accomplishing the analysis and having necessary means for that, may define the type of alteration. The malware detection software may be configured to formulate instructions for restoring the altered files, especially if the alteration is a simple mathematical operation recognizable by the malware detection software. According to some other embodiment of the invention the definition of the type of alteration may be accomplished in a network element configured to perform such analysis. Further, the network element may be configured to formulate instructions for restoring the altered files. If the network element is able to formulate the instructions, the instructions can be delivered to the computer device for utilization. According to a still further embodiment of the invention the infected files can be replaced with the files from a network element maintaining the backup files of a computer device. According to an additional embodiment of the invention the infected files to be replaced with the backup files are stored for security in case something goes wrong with the replacement.

According to some embodiment of the invention a file may be isolated from the system if the comparison of the alteration to the file does not match predetermined alteration type relating to ransomware, such as modifications of access rights and/or modification of the file. The isolation shall be understood as broadly comprising different types of method to prevent the system from accessing and/or using the file, for example.

Figure 3:
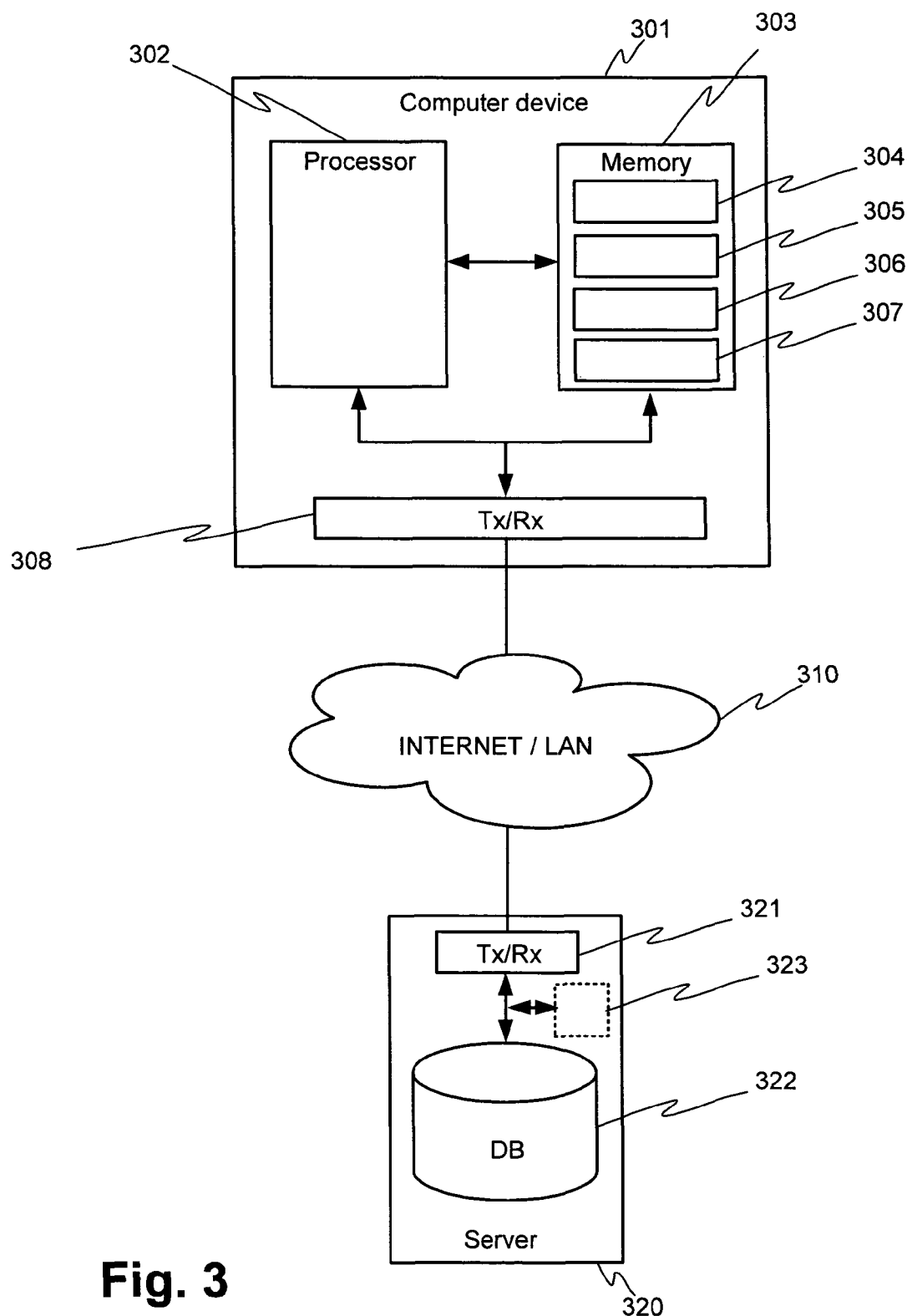
FIG. 3 illustrates a computer system according to an embodiment of the invention.

FIG. 3 illustrates a computer system according to an embodiment of the invention. The computer device 301 in the system is implemented as a combination of computer hardware and software. The device comprises a processor 302, a memory 303 and transceiver 308. The memory 303 is configured to store computer program code relating to the functioning of the computer device 301 and especially software files for executing the method according to the invention when implemented in the processor 302. More specifically, the memory 303 contains software code 304 for detecting the malware when executed in the processor. Further, the memory 303 contains software code 305 for detecting infected i.e. altered files when executed in the processor 302 and any infection related information, such as a time of infection. The detection of the altered files may be based on at least one of the following: a modification to access rights of the file, a modification of a predetermined type to the file. The memory 303 also contains software code 306 for causing the computer to initiate the restoration of the altered files detected by means of software code 305 when executed in the processor 302. For example, the restoration may comprise a step of defining a reverse operation to the detected alteration in the file. Further, the memory 303 contains data 307 to be utilized when executing software code 304, 305, 306 in the processor 302 of the computer device 301. The data 307 may comprise information on malware, ransomware, instructions to be used in deactivation of malware, information on target files, information on alterations to files and instructions to be used in restoration, for instance. The software code elements 304, 305, 306 and data 307 may form at least part of the malware detection software. Alternatively, any of the mentioned elements and data may be a separate item from the malware detection software, but exploitable by malware detection software if needed. The computer device also comprises a transceiver 308 for communicating with a network element, such as server 320 containing information relating to the operation of the malware detection software, over a network 310, such as Internet or a LAN (Local Area Network).

The server 320 comprises at least a transceiver 321 and a database 322. The transceiver 321 is configured to communicate with the computer device 301 over the network 310. The database 322 comprises information at least on malware, ransomware, instructions to be used in deactivation of malware, information on target files of a ransomware if any, information on alterations to files by a ransomware and instructions to be used in a restoration of a file.

Optionally, the server 320 may also comprise a processor with necessary memory means 323 to execute at least partly similar tasks as the computer device 301. In such a case, some of the tasks relating to detection of the malware and/or ransomware, deactivation of malware and/or ransomware, detection of infected files and restoration of the infected files may be carried out in the server. For example, in a so called cloud computing model the computer device 301 may comprise only a lightweight agent software for executing basic operations of malware monitoring while the majority of the data detection, analysis and restoration is carried out in a server 320 residing in a network infrastructure by executing computer program code in a processor of the server 320. A computer device 301 may perform a preliminary recognition of a malware in the device. If a preliminary recognition indicates that there can be an infection, the lightweight agent software may open an access for a pre-agreed network element and request for full scanning. In such a case the network element performs the malware scanning by performing calculations relating to the analysis remotely in the network. If the scanning indicates a ransomware infection in the computer device, it can request at least some files to be delivered to the server for further analysis, such as detection of alterations in the files and restoration of them. The restored files are returned to the computer device. The operation as described above requires that the malware cannot prevent the operation of the malware detection software. This is typically the case due to the fact that malware detection software is configured to operate in all circumstances and thus enables any communication with the server 320.

According to another embodiment of the invention the computer device 301 may detect and deactivate the ransomware in the device, but may request the server 320 to detect an alteration in a file caused by the malware of a predetermined type. The computer device 301 is configured to transmit at least one file to the server 320 for detection. The server is configured to utilize information stored in the server in the detection and initiate a restoration of the altered file in response to the detection of the alteration. The server 320 is further configured to utilize information stored in the memory for restoration. Finally, the server 320 is configured to transmit the restored file to the computer device 301.

As already indicated, the server 320 has an important role in maintaining up-to-date information with respect to malware and especially to ransomware. The information may comprise at least information on malware, ransomware, instructions to be used in deactivation of malware, information on target files of a ransomware if any, information on alterations to files by a ransomware and instructions to be used in a restoration of a file. The computer device 301 may download up-to-date information into its database in a memory to be used locally. The information stored in the server 320 is maintained by an administrator of the server. The administrator is typically the provider of malware detection software. The server 320 is provided with necessary input/output means for maintenance purposes.

The server 320 can also be configured to receive a backup of the files by means of communication with the computer device 301. The server 320 stores the backup files and is configured to enable the utilization of the backup files as already described above.

The computer device 301 and the server 320 may contain multiple processors 302 and multiple memories 303 and/or databases 322 to implement the current invention. In an embodiment of the invention the computer device may comprise two processors 302. The first processor is configured to execute only processes relating to the malware detection software and the other processor takes care of the other processes in the computer device. Correspondingly, separate memories may be arranged to store information relating to the operation of the malware detection software and to any other information. According to an embodiment of the invention the processor and memory dedicated to the malware detection software are isolated from any other operation of the device. By means of such a solution the security level may further be increased due to the fact that a malware cannot easily access a processor and/or a memory dedicated to malware detection software.

Even if the piece of software discussed here is named as malware detection software it does not give any indication of the tasks of the software. As described here, in addition to detection, the piece of software may also comprise other tasks such as deactivating the detected malware, detecting infected files in the system and restoring the infected files, for instance. Thus, the term malware detection software shall not be interpreted narrowly in this context.

The computer device refers to any device, which comprises elements and/or functionalities that may be vulnerable to a malware, especially to a ransomware. Such devices are at least personal computers (PC), laptops, tablet computers and other portable devices, such as mobile phones. In some cases the computer device according to the invention can be understood as a combination of devices coupled to each other having a vulnerability to malware and protected by malware detection software.

Moreover, the term database used here shall be understood broadly. The database is data storage with a predetermined structure comprising information as referred in the description above. The data can be stored in a memory of the computer device or on the server or in any combination of these.

Although specific embodiments have been illustrated and described herein, it will be appreciated by those of ordinary skill in the art that any arrangement which is contemplated to fill the same purpose may be substituted for the specific embodiment shown. This application is intended to cover any adaptations or variations of the present invention. Thus, it is to be appreciated that this invention is limited by the claims and the equivalents thereof only.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   detecting a user file hidden or obfuscated by malware, the detecting being in response to a successful deactivation of the malware; and
   restoring the hidden or obfuscated user file in response to the detection of the user file hidden or obfuscated by the malware;
   wherein the detection of the user file hidden or obfuscated by the malware is at least partly based on at least one of the following: a modification to access rights of the user file and a modification to a predetermined file type of the user file; and
   wherein the detection of the user file hidden or obfuscated is at least partly based on a predetermined file type of the malware.

2. The method of claim 1, the method further comprising defining a time of access of the malware in the computer system.

3. The method of claim 2, wherein the user file hidden or obfuscated by the malware is detected among files altered between a time of access of the malware in the computer system and a time of deactivation.

4. The method of claim 1, wherein the detection of the user file hidden or obfuscated is at least partly based on a comparison of a file to a corresponding backup file.

5. The method of claim 1, wherein the restoration of the hidden or obfuscated user file is based on a detection of at least one of the following: a modification to access rights of the user file and a modification of a predetermined type to the user file.

6. The method of claim 1, wherein the restoration of the hidden or obfuscated user file is accomplished by replacing the detected hidden or obfuscated user file with a corresponding backup file.

7. The method of claim 1, wherein the restoration of the user file is based on a reverse operation in which a decryption algorithm is applied to the detected hiding or obfuscation in the user file.

8. The method of claim 7, wherein the reverse operation is at least one of the following: making the user file visible by resetting a flag indicating hidden status, resetting access rights to a file according to user information stored in the computer system, killing a locking process of a file, decrypting a file, and applying a predetermined de-obfuscation algorithm in restoration of a file.

9. A computer device, comprising:
at least one processor, and
at least one memory including computer program code,
the at least one memory and the computer program code configured to, with the at least one processor, cause the computer device to perform at least the following:
detect a user file hidden or obfuscated by malware, the detecting being in response to a successful deactivation of the malware; and
restore the hidden or obfuscated user file in response to the detection of the user file hidden or obfuscated by the malware;
wherein the detection of the user file hidden or obfuscated by the malware is at least partly based on at least one of the following: a modification to access rights of the user file and a modification to a predetermined file type of the user file; and
wherein the detection of the user file hidden or obfuscated is at least partly based on a predetermined file type of the malware.

10. The computer device of claim 9, further comprising an updatable database comprising information relating to at least the malware configured to hide or obfuscate the user file stored in the computer device.

11. The computer device of claim 10, wherein the updatable database comprises information on at least one of the following: instructions for deactivating the malware, information on user files targeted by the malware, information on hiding or obfuscation executed by the malware, and instructions for restoring the hidden or obfuscated user file.

12. The computer device of claim 10, wherein the information in the database is updated by utilizing a transceiver of the computer device for communication with a server residing in a network.

13. A server, comprising:
at least one processor, and
at least one memory including computer program code,
the at least one memory and the computer program code configured to, with the at least one processor, cause the server to perform at least the following:
receive a request to detect a user file hidden or obfuscated by malware, the request being transmitted to the server by a computer device;
detect the user file by utilizing information stored in the server;
restore the user file in response to the detection of the user file;
transmit a restored file to the computer device;
wherein the detection of the user file hidden or obfuscated by the malware is at least partly based on at least one of the following: a modification to access rights of the user file and a modification to a predetermined file type of the user file; and
wherein the detection of the user file hidden or obfuscated is at least partly based on a predetermined file type of the malware.

14. The server of claim 13, wherein the restoration of the hidden or obfuscated user file comprises at least utilization of information stored in the memory of the server.

15. A computer program product comprising a non-transitory computer-readable medium bearing computer program code embodied therein for use with a computer, the computer program code comprising:
code for detecting a user file hidden or obfuscated by malware, the detecting of the user file being in response to a successful deactivation of the malware; and
code for restoring the hidden or obfuscated user file in response to the detection of the user file hidden or obfuscated by the malware;
the computer program code further comprising: code for detecting a hidden or obfuscated user file based on at least one of the following: a modification to access rights of the user file and a modification to a predetermined file type of the user file; and
wherein the detection of the user file hidden or obfuscated is at least partly based on a predetermined file type of the malware.

16. The computer program product of claim 15, the computer program code further comprising: code for defining a reverse operation in which a decryption algorithm is applied to the detected alteration in the user file.

17. The method of claim 1, wherein restoring the hidden or obfuscated user file comprises applying at least one de-obfuscation instruction set to the hidden or obfuscated user file.

* * * * *